April 25, 1967 R. J. KOERNER 3,316,420

SELECTION DEVICE

Filed Aug. 30, 1963 2 Sheets-Sheet 1

INVENTOR
RALPH J. KOERNER
BY Arthur Freilich
ATTORNEY

April 25, 1967 R. J. KOERNER 3,316,420

SELECTION DEVICE

Filed Aug. 30, 1963 2 Sheets-Sheet 2

INVENTOR
RALPH J. KOERNER

BY Arthur Freilich

ATTORNEY 3,316,420

SELECTION DEVICE

Ralph J. Koerner, Los Angeles, Calif., assignor, by mesne assignments, to The Bunker-Ramo Corporation, Stamford, Conn., a corporation of Delaware Filed Aug. 30, 1963, Ser. No. 305,754

12 Claims. (Cl. 307—88)

Figure 1:
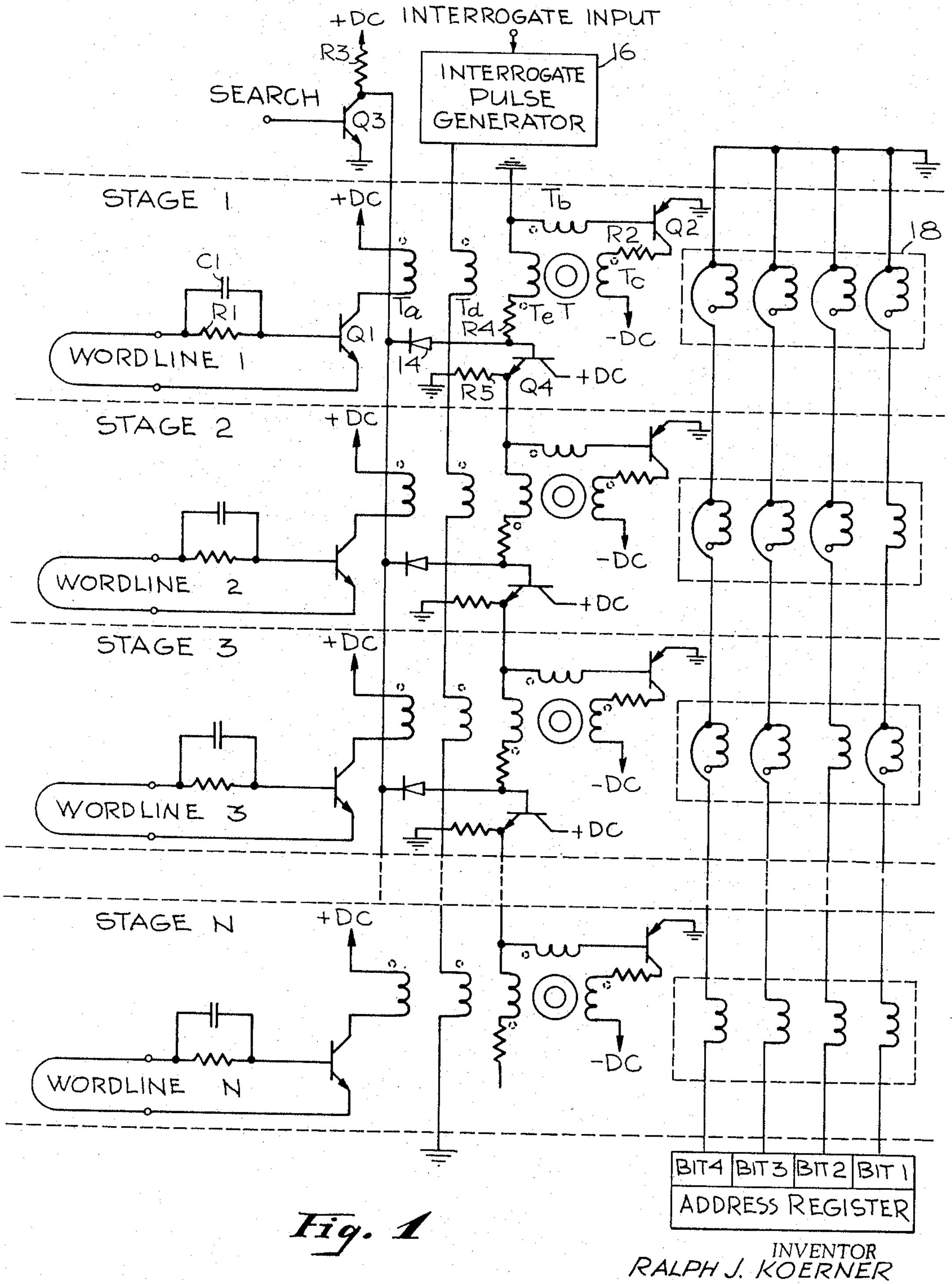

This invention relates generally to data processing apparatus and more particularly to a selection device for use with a plurality of binary elements, respectively arbitrarily numbered 1, 2, 3 . . . *N* for seeking out and selecting the lowest numbered element in a given state and finds particular utility in monitoring a plurality of conductors.

For purposes of illustration and explanation, the invention herein will be described in connection with binary digital data processing apparatus but it is specifically pointed out that the term "binary" is used only in the sense that two different broad classes of manifestations are contemplated. For example, the two possible values of a binary manifestation can be respectively represented by the presence and absence of an electrical pulse but in addition the two values can be respectively represented by the presence and absence of an electrical pulse having predetermined and very precise characteristics.

In many diverse digital data processing systems, a bank of binary elements is provided with each element being connected to a different conductor so as to sense a binary signal thereon, which can be manifested by the presence or absence of a pulse having predetermined characteristics and can be representative of the occurrence or non-occurrence of a different condition. The binary element can be made to switch to a second state, for example, in response to the presence of said pulse. It is often desired to be able to examine the respective states of the various elements at the end of a certain time interval in order to determine which elements were switched to the second state or alternatively which elements remained in the first state. Although straightforward commutation techniques can be used to sequentially sample each element, this procedure is often unnecessarily slow, particularly where the number of elements having the sought state is small compared to the total number of elements in the bank.

This latter situation often arises, for example, in the use of digital memories of the type disclosed in U.S. Patent No. 3,031,650 which can appropriately be considered a content addressable memory inasmuch as its storage locations are addressed or selected on the basis of the contents stored therein rather than on the basis of some arbitrarily assigned address. Such a memory permits all of the memory storage locations to be simultaneously searched to determine whether any of the words stored therein are identical to a search word being sought. A different word line is associated with all of the storage elements of each storage location and for each bit of any stored word which mismatches the corresponding but of the search word, a pulse is provided on the word line associated with the location containing the mismatched bit. (Of course, in an alternative embodiment, pulses can be provided to represent a match situation.) Each word line can have a different binary element connected thereto which can be switched to a second state in response to the presence of one or more pulses on the associated word line. At the end of a search period, it is desirable to examine all such binary elements to determine which ones, if any, remained in the first state. A binary element remaining in the first state would of course indicate that all of the bits stored in the associated storage location are respectively identical (i.e. match) to the corresponding bits of the search word. In addition to merely determining which binary elements remained in the false state, it is sometimes desirable to make these determinations sequentially in order to permit this information to be conventionally utilized to subsequently read out, write in, or modify the same or other information in the same or another memory.

Inasmuch as the number (M) of binary elements remaining in the first state for most contemplated applications of a content addressable memory will be extremely small compared to the number (N) of binary elements which are switched to the second state, it is desirable to avoid the utilization of conventional time consuming communication techniques to sequentially sample each of the elements.

In view of this, it is an object of the present invention to provide a selection device for use with a plurality of binary elements respectively arbitrarily numbered 1, 2, 3 . . . *N* for seeking out and selecting the lowest numbered element in a given state.

More particularly, it is an object of this invention to provide such a selection device which can select the lowest numbered element in a given state in the same finite time period regardless of which particular element is in fact the lowest numbered element in said given state.

It is a still further object of this invention to provide such a selection device which can sequentially select each of the M binary elements, of a total number of N binary elements, in a given state in M finite time periods regardless of which M elements are in said given state.

The above objects are achieved by means disclosed in both U.S. patent application Ser. No. 296,053 entitled Selection Device, filed on July 18, 1963 by Ralph J. Koerner and Edward J. Schneberger and in U.S. application Ser. No. 296,001 entitled Selection Device, filed on July 18, 1963 by Robert N. Mellott, both applications being assigned to the same assignee as this present application. The invention disclosed herein presents a different and unique hardward approach from that disclosed in either of the above cited applications to arrive at functionally similar results.

Briefly, the invention herein is based on the recognition that a plurality of identical switching circuits, each including regenerative feedback means and each being normally responsive to the occurrence of the same conditions for initiating regeneration therein, can be so arranged that regeneration initiated in any one of the circuits can be used to exhibit regeneration in all other circuits.

In a preferred embodiment of the invention, a plurality of square loop magnetic transformer cores, each capable of assuming either a first or second remanent state, is employed as the plurality of binary elements. Each transformer core has a first winding coupled thereto which can, for example, be connected to a different one of the plurality of word lines in a content addressable memory. In addition, each transformer core has second and third windings coupled thereto which are connected in a regenerative feedback circuit including a transistor amplifier. In response to the appearance of a pulse on one of the word lines, the transformer core associated therewith begins to switch from its first to its second state of remanence. The regenerative action of the second and third windings accelerates the switching. Assuming that the presence of a pulse on a word line represents a mismatch condition, words in the content addressable memory which match a search word, can be located by merely determining those transformer cores which remained in a first state subsequent to the completion of a search. This determination can be made by applying an interrogate pulse to a fourth winding connected to each of the transformer cores which tends to switch all of the transformer cores to a second state. Of course, only those cores in a first state will actually switch to a second state. The switching will again be regenerative. In order to permit only one of the content addressable memory word locations to be selected, means are provided for preventing all but one of the transformer cores from actually switching in response to the generation of the interrogation pulse. This preventing or inhibiting is effected by including a fifth winding on each of the transformer cores. Each fifth winding is so connected that a voltage induced in it is applied to the regenerative feedback circuits associated with all of the higher numbered transformer cores to prevent regeneration in those latter cores. As a consequence, regeneration is permitted in only one of the transformer cores thereby assuring selection of only one of the content addressable memory locations.

Several aspects of the present invention distinguish it from the invention disclosed in the above cited U. S. patent application Ser. No. 296,053 (Koerner and Schneberger). Principal among these is that in the cited application all of the magnetic core binary elements are switched in response to the generation of an interrogation pulse but only one of the cores so switched forward biases a transistor in an output circuit connected thereto. On the other hand, in the present application, due to the regenerative feedback loop associated with each transformer core, only one core is switched in response to the generation of the interrogation pulse and the switching of all other cores is inhibited.

Although the selection device disclosed herein finds particular utility in conjunction with content addressable memories, it additionally can be advantageously employed wherever a plurality of conductors, on which signals having predetermined characteristics can randomly appear, are to be monitored. For example only, the selection device can be used to monitor a plurality of telephone lines which are randomly and possibly simultaneously energized.

Figure 2:
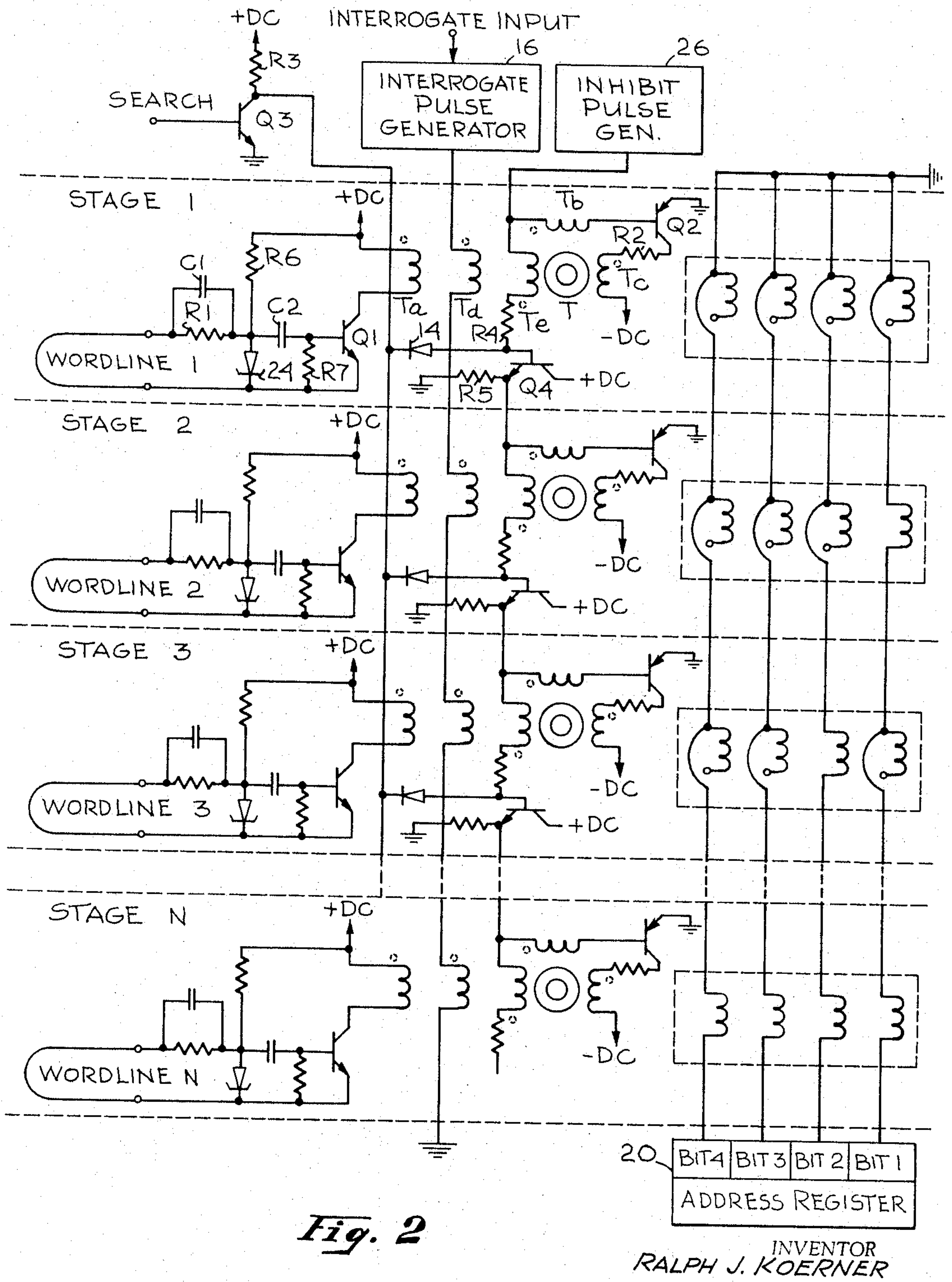

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a schematic diagram of a preferred embodiment of the present invention; and FIG. 2 is a schematic diagram of an alternative embodiment of the present invention particularly adapted for use with those types of content addressable memories which are capable of performing magnitude comparison searches.

Attention is now called to FIG. 1 which schematically illustrates a selection device comprising a preferred embodiment of the invention. It is contemplated that the selection device can be used to monitor N conductors or word lines of a content addressable memory in order to detect both those word lines on which pulses having predetermined characteristics appear and to subsequently choose one out of M word lines on which a pulse appeared or alternatively did not appear. It will be assumed herein that the disclosed embodiment of the invention is adapted to be utilized with a content addressable memory of the type illustrated in FIG. 1 of the above cited U.S. patent application Ser. No. 296,053 (Koerner and Schneberger) in which pulses applied to word lines were representative of bit mismatches and nulls on word lines were representative of bit matches. Assuming that it is desirable to select one of the locations storing a matching word, the selection device herein is provided to select one out of the M possible word lines, of the total number of N word lines, on which no pulses appear.

The selection device, as shown in FIG. 1 consists of N stages, each stage being connected to a different one of the N word lines to be monitored. Inasmuch as each of the stages is substantially identical, detailed explanation will be directed only to stage 1 which is typical of all the stages.

A parallel circuit including a capacitor C1 and a resistor R1 couples one end of the word line to the base of an NPN transistor Q1. The second end of the word line is connected to the emitter of transistor Q1. The collector of transistor Q1 is connected through a first transformer winding $T_a$ to a source of positive potential. The winding $T_a$ is inductively coupled to a square loop transformer core T. In response to a pulse appearing on the word line, the transistor Q1 will be forward-biased to thereby establish a current in winding $T_a$. Assuming that the square loop transformer core T is initially in a first remanent state of magnetization, the current through winding $T_a$ will tend to initiate switching of the core T to its second remanent state.

A second transformer winding $T_b$ is also inductively coupled to the transformer core T. A first terminal of the winding $T_b$ is grounded while the second terminal of winding $T_b$ is connected to the base of a PNP transistor Q2. The emitter of transistor Q2 is grounded and the collector thereof is connected through a resistor R2 and a third transformer winding $T_c$ to a source of negative potential. With the winding senses as illustrated by the dotted terminals, it should be apparent that collector-emitter conduction in transistor Q1 will tend to forward-bias transistor Q2. That is, a current into the dotted terminal of transformer winding $T_a$ will induce a voltage in transformer winding $T_b$ making its first or dotted terminal positive with respect to its second or undotted terminal. Since the first terminal is grounded however, the base of transistor Q2 will be driven negative. As a consequence transistor Q2 will be forward-biased so as to initiate current flow in transformer winding $T_c$. Current flowing into the dotted terminal of transformer winding $T_c$ will aid in tending to switch the transformer core T to a second state and will increase the potential induced in transformer winding $T_b$ to thereby further forward-bias transistor Q2. Consequently, it should be apparent that a pulse on the word line will initiate switching in transformer core T which will in turn initiate regenerative feedback action between transformer windings $T_b$ and $T_c$ which will subsequently drive the core T to a second state.

When a search is being conducted in the content addressable memory, a positive potential is applied to the base of transistor Q3. Inasmuch as the collector of transistor Q3 is connected through a resistor R3 to a source of positive potential and since the emitter of transistor Q3 is connected to ground, the collector will be substantially grounded during the period in which a search is conducted. The collector of transistor Q3 is connected to the cathode of a diode 14 connected in each of the stages, except stage N. The anode of the diode 14 is connected to a first terminal of a resistor R4 whose second terminal is connected through a transformer winding $T_e$ to the first terminal of transformer winding $T_b$. As a consequence of the conditions established by transistor Q3 and diodes 14, both terminals of transformer winding $T_e$ will be grounded during the period in which a search is conducted. Therefore, its presence is not pertinent to the operation of the stage thus far recited. That is, it has thus far been shown that the presence of a pulse on the word line during a search forward-biases transistor Q1 which initiates a current in winding $T_a$ which in turn initiates a regenerative effect between windings $T_b$ and $T_c$ which switches core T to a second state.

Likewise, consideration of winding $T_d$ which is also inductively coupled to core T is not pertinent to the operation of the selection device during the period in which a search is conducted. This is because both terminals of windings $T_d$ can be considered as grounded in the absence of the generation of an interrogation pulse by interrogation pulse generator 16. It is however, pointed out at this time that the winding $T_d$ of stages 1 through N are all connected in series between the output of the interrogation pulse generator 16 and ground.

The anode of diode 14 in addition to being connected to the first terminal of resistor R4 is connected to the base of an NPN transistor Q4. The collector of transistor Q4 is connected to a source of positive potential while the emitter thereof is connected through a resistor R5 to ground. The first terminal of transformer winding $T_e$ is connected to the emitter of transistor Q4 of the immediately preceding stage. That is, the first terminal of transformer winding $T_e$ of stage 2 is connected to the emitter of transistor Q4 of stage 1 and similarly the first terminal of winding $T_e$ of stage *n* is connected to the emitter of transistor Q4 of stage *n*–1.

It has thus far been seen that in response to a search, those transformer cores T associated with memory locations in which the stored words do not match the search word, will be set to a second state while those transformer cores T associated with word locations whose stored words match he search word will remain in a first state. In order to develop an output signal representing the address of a memory location storing one of the matching words, arbitrarily the lowest numbered matching word, an output circuit is provided in each of the stages.

Let it be assumed that the content addressable memory has sixteen word locations and that as a consequence four bits are sufficient to represent the address of any one of the word locations. Consequently, each output circuit 18 includes encoding means for applying binary address signals to four bit channels. More particularly, each of the four bit channels is connected between ground and the input to a corresponding stage of an address register 20. Windings inductively coupled to the transformer T of each stage are connected to the bit channels so as to represent the address of that stage and therefore the associated word location. For example, in stage 1 none of the bit channels are inductively coupled to the transformer core T in the output circuit 18. Consequently, stage 1 is capable of generating an output signal constituting the address 0000. On the other hand, bit channel 1 is inductively coupled to the transformer core T of stage 2 and therefore stage 2 is capable of generating the binary address 0001. Similarly, stage 3 can generate the binary address 0010.

In order to generate the address of one of the word locations in which a match between the stored word and the search word was detected, an interrogation pulse is generated by the interrogation pulse generator 16 and in addition the positive potential is removed from the base of transistor Q3 to thereby off-bias it. The effect of the generation of the interrogation pulse is to initiate current in transformer winding $T_d$ which tends to switch all of those transformer cores in a first state to a second state. That is, since the windings $T_a$ and $T_d$ have the same polarity, a current in winding $T_d$ will have the same effect as when a current is initiated in winding $T_a$. Thus, regeneration will begin between windings $T_b$ and $T_c$. This action in turn will induce a voltage in winding $T_e$ (since the first terminal of winding $T_e$ is no longer grounded through diode 14). The voltage induced in the winding $T_e$ of stage 1 will be coupled through transistor Q4 to the first terminal of winding $T_b$ of stage 2. Noting the sense of winding $T_e$, it should be apparent that the voltage induced therein will tend to cancel the voltage induced in winding $T_b$ of stage 2. That is, the voltage induced in winding $T_e$ of stage 1 will raise the potential at the first terminal of winding $T_b$ of stage 2 by an amount substantially equal to the reduction of the potential on the base of transistor Q2 of stage 2, thereby preventing or inhibiting regeneration in stage 2. Similarly, the increase in potential at the first terminal of winding $T_b$ of stage 2 will be reflected at the first terminal of the windings $T_e$ of all the succeeding stages. Thus, only one transformer core T will be switched to a second state in response to the generation of an interrogation pulse. In response to a transformer core T switching, a binary address representing the stage and the memory word location associated therewith will be entered into the address register 20.

It has thus far been shown how the address of one of M word locations can be developed where nulls appear on M of N word lines. In the event that it is desired to sequentially generate the addresses of all of the M word locations in which stored words match the search word, two different techniques can be employed. Initially, each address read out can be utilized to temporarily modify a tag bit in the identified word location in the content addressable memory. Thus, a first search can be done which can for example result in M matches. The address of the lowest numbered word will be generated and as a result a tag bit in the word stored in the addressed location will be modified. Thence, a second search can be conducted which will result in M–1 matches since the modification of the tag bit in the first matched word will prevent that word from matching the search word. In this manner, addresses representing each of the word locations storing a matching word can be sequentially generated.

An alternative technique for sequentially generating all of the addresses of the M locations storing matching words does not require that successive searches be conducted. It will be recalled that in response to the generation of an interrogation pulse, only the lowest numbered transformer core T was switched to a second state. It would thus appear that a subsequent interrogation pulse could be generated which would then cause the next lowest numbered transformer core T to switch to a second state to thereby cause its associated binary address to be generated. This second technique can be satisfactorily employed so long as fewer than a determinable maximum number of stages are utilized. That is, since a small amount of flux in each of the transformer cores T in a first state is switched each time an interrogation pulse is generated, even though only one such core is actually switched to a second state, there is a very definite practical limit as to how many interrogation pulses can actually be effectively generated so as to restrict switching to only one transformer core T in response to each interrogation pulse. In order to prevent this partial flux switching, and virtually assure complete saturation in each of the transformer cores T in either a first or a second direction, a bistable element, such as a thyristor, can be substituted for the transistor Q2. Utilization of a thyristor would assure that partial flux switching toward a second state in those cores in a first state resulting from the generation of an interrogation pulse and occurring prior to the regeneration being cut off would be compensated for by causing just as much partial switching toward a first state as a result of the thyristor cutting off.

In addition to employing content addressable memories for locating stored words which identically match or mismatch a search word, content addressable memory implementations have been introduced in the prior art which enable magnitude comparison determinations to be made virtually as rapidly as match and mismatch determinations. One technique for effecting magnitude comparison searches involves considering the bits of the search word and stored words in order of decreasing significance, that is from most to least significant, and noting the value of the search bit when the first bit mismatch signal is developed. That is, assume that a "greater than" search is being conducted meaning that all words in memory which have a magnitude greater than the search word will be considered as matches and all words in memory having a magnitude less than the search word will be considered as mismatches. If the first bit mismatch signal is generated when a search bit having a value of "1" is being processed, it can immediately be concluded that the corresponding bit in the word is "0" and consequently that the stored word is less than the search word and that it therefore mismatches the search word. On the other hand, if the first mismatch signal is developed when the search bit being considered has a value of "0," then it can be immediately concluded that the stored word is greater than the search word and therefore matches the search word. It should be realized that regardless of whether the stored word matches or mismatches the search word, the first bit mismatch signal developed is the determining factor, it being recalled that the bits are considered in order of decreasing significance. Therefore, once a bit mismatch signal is developed for a particular word, subsequent bit mismatch signals developed for that word should be disregarded. Also, a bit mismatch signal developed when the search bit has a value of "0" and a "greater than" magnitude comparison criteria is being employed, should not cause a word mismatch to be indicated.

In order to provide the selection device of FIG. 1 with these capabilities, it can be modified as shown in FIG. 2. The differences between the selection device of FIG. 1 and FIG. 2 lies in the provision of a tunnel diode thresholding amplifier between the word line and the transistor Q1 and the incorporation of an inhibit pulse generator coupled to the first terminal of winding $T_b$ of stage 1.

The thresholding amplifier includes a tunnel diode 24 biased for bistable operation. The tunnel diode 24 is connected in series with a resistor R6 to a source of positive potential. Additionally, a capacitor C2 is connected between the resistor R1 and the base of transistor Q1 and a resistor R7 connects the base of transistor Q1 to the emitter thereof.

In response to a bit mismatch signal appearing on the word line, the tunnel diode 24 is switched from a first stable state to a second stable state. Subsequent mismatch signals appearing on the word line are ineffective to switch the tunnel diode. Therefore, the tunnel diode thresholding amplifier has the effect of causing only the first bit mismatch signal associated with each word location to be considered and all others to be ignored. The inhibit pulse generator 26 is utilized to prevent or inhibit certain bit mismatch signals from causing the associated transformer core T to be switched to a second state. That is, if a "greater than" magnitude comparision criteria is being employed, and a search bit having a value of "0" is being processed, it is not desired that a bit mismatch signal cause the transformer core T to switch to a second state since the stored word satisfies the comparison criteria and therefore by definition matches the search word. It should be appreciated that the generation of a positive pulse by the inhibit pulse generator 26 will prevent regeneration in all of the stages and therefore during the search bit intervals when bits of certain values are being processed, none of the transformer cores T can be switched to a second state.

From the foregoing, it should be apparent that a selection device has been provided herein which enables each of M bistable element in a given state, of a total number of N such elements, to be selected in M finite time periods. Although means for resetting various ones of the bistable devices, as e.g. tunnel diode 24, transformer cores T and thyristor Q2 (where used) have not been shown, such means should be apparent. For example, in response to appropriate timing signals, the supply voltages can be removed from the tunnel diode and thyristor and a large current can be driven through a core reset winding (not shown).

The embodiments of the invention in which an exclusive property or privilege is claimed are defined as follows:

1. For use with a plurality of binary elements, respectively arbitrarily numbered 1, 2, 3, . . . *N*, each of which is able to independently assume either a first or second state, selection means for selecting the lowest numbered binary element in said first state comprising:

means for coupling a signal to all of said binary elements tending to switch said binary elements to said second state; and means responsive to the initiation of switching to said second state in any one of said binary elements for inhibiting switching to said second state in all higher numbered binary elements.

2. For use with a plurality of binary elements, respectively arbitrarily numbered 1, 2, 3, . . . *N*, each of which is able to independently assume either a first or second state, selection means for selecting the lowest numbered binary element in said first state comprising:

a plurality of output circuits;

means connecting each of said binary elements to a different one of said output circuits for causing each output circuit to normally provide an output signal in response to switching of the binary element connected thereto;

means for coupling a signal to all of said binary elements tending to switch said binary elements to said second state; and means responsive to the initiation of switching to said second state in any one of said binary elements for inhibiting switching to said second state in all higher numbered binary elements.

3. The selection means of claim 2 wherein said means for coupling a signal to all of said binary elements includes a plurality of regenerative feedback circuits, a different regenerative feedback circuit being connected to each of said binary elements; and said means for inhibiting switching in said binary elements includes means for preventing regeneration in said feedback circuits.

4. The selection means of claim 3 wherein each of said elements comprises a substantially square loop magnetic transformer core.

5. In combination with a plurality of conductors respectively arbitrarily numbered 1, 2, 3, . . . *N*, on which pulses can randomly appear, means responsive to said pulses for recording their appearance and for subsequently sequentially initiating current in a plurality of output circuits each uniquely associated with one of said conductors on which no pulses appeared, said means comprising:

a plurality of bistable elements respectively arbitrarily numbered 1, 2, 3, . . . *N*;

a plurality of regenerative feedback circuits each coupled to a different one of said bistable elements;

means coupling each of said plurality of conductors to a different one of said bistable elements for initiating regeneration in the regenerative circuit coupled thereto for driving said bistable element to a second state in response to the appearance of a pulse on said conductor; and means interconnecting said regenerative feedback circuits and responsive to the initiation of regeneration in any one of said circuits for inhibiting regeneration in all higher numbered circuits.

6. The combination of claim 5 wherein each of said bistable elements comprises a substantially square loop magnetic transformer core.

7. The combination of claim 6 wherein each of said regenerative circuits includes first and second windings inductively coupled to said core;

a transistor; and means coupling a first of said windings to the base of said transistor and the second of said windings to the collector of said transistor.

8. The combination of claim 6 including amplifier means coupling each of said conductors to a winding inductively coupled to one of said transformer cores.

9. The combination of claim 8 wherein said amplifier means includes a tunnel diode biased for bistable operation.

10. The combination of claim 7 including means for selectively disabling said means interconnecting said regenerative circuits.

11. A device including a plurality of stages sequentially numbered 1 to N with each stage responsive to pulses randomly appearing on a corresponding one of a plurality of conductors comprising:

a core in each stage having a first and a second magnetic state with first, second, third, fourth and fifth winding means magnetically coupled thereto, said first winding means of each stage coupled to the corresponding conductor to respond to a pulse thereon and develop a first potential on said fourth winding means, said second winding means of all stages coupled in series to form a first series path, said third and fourth winding means of each stage coupled together, and said third winding means having a biased and an unbiased state;

isolating means between each two sequential stages and coupled between the third winding means thereof to form a second series path;

first and second points of potential with said first point of potential coupled to said fifth winding means in each stage;

switching means in each stage having a control terminal coupled to said fourth winding means and a load current path coupled between said second point of potential and said fifth winding means;

first pulse means coupled to said first series path for applying a pulse thereto so that the core of the lowest numbered stage in which the core is in said first state responds to develop a second potential on the fourth winding means thereof and to develop a potential on said third winding means when in said unbiased state, said switching means of each stage responding to said first or second potentials developed on the third winding thereof to regeneratively switch the corresponding core from the first to the second state;

a diode in each stage having a succeeding stage and coupled to said second series path between said third winding means thereof and the isolating means of the succeeding stage;

second pulse means coupled to said diodes for applying a pulse to selectively maintain said third winding means in said biased or said unbiased state, said third winding means of said lowest numbered stage in which the core is in said first state responding to said core switching to said second state to develop a potential thereon when in said unbiased state to maintain the switching means of all succeeding stages nonconductive and said third winding means of each stage having a succeeding stage, when in said biased state maintaining said succeeding stage substantially independent therefrom for responding to a pulse on the corresponding conductor.

12. A selection device for use with a plurality of conductors respectively arbitrarily defining stages numbered 1 to N, in which pulses can randomly appear comprising:

a plurality of core means each having first and second magnetic states and respectively associated with stages 1 to N, each having first, second, third, fourth and fifth winding means magnetically coupled thereto, said second winding means of all stages coupled in a first series path, said third and fourth winding means of each stage coupled together;

means in each stage coupled between the conductor thereof and said first winding means for responding to a pulse on said conductor to develop a potential on said fourth winding means;

emitter follower means in each stage having a succeeding stage, said third winding means and said emitter follower means of all sequential stages coupled in a second series path;

a source of potential;

switching means in each stage having a control terminal coupled to said fourth winding means and a load current path coupled between said source of potential and said fifth winding means;

selectively actuatable first pulse means coupled to said first series path to apply a pulse to develop a potential on said fourth winding means of the core means of the lowest numbered stage in which said core means is in said first state, said switching means of each stage responding to either of said potentials developed on said fourth winding means to regeneratively switch the corresponding core from said first to said second state;

diode means in each stage having a succeeding stage and coupled to the third winding means thereof;

selectively actuatable second pulse means coupled to each of said diode means for applying a pulse to selectively render said third winding means in a biased or an unbiased state, said third winding means in said lowest numbered stage in which the core means is in said first state responding to said core means switching to said second state to develop a potential thereon when in said unbiased state to maintain the switching means of all succeeding stages nonconductive, said third winding means of each stage having a succeeding stage, when in said biased state maintaining said succeeding stage substantially independent therefrom for responding to a pulse on the corresponding conductor;

and output winding means in each stage coupled to the core means thereof to develop stage identifying signals when said core means switches from said first to said second state in response to said first pulse means.

References Cited by the Examiner

UNITED STATES PATENTS

| | | | |
|---|---|---|---|
| 3,056,115 | 9/1962 | Lo | 340—174 |
| 3,061,740 | 10/1962 | Markowitz | 307—88 X |
| 3,267,441 | 8/1966 | Busch | 340—174 |
| 3,270,210 | 8/1966 | Mueller | 307—88 |

BERNARD KONICK, *Primary Examiner.*

TERRELL W. FEARS, *Examiner.*

S. M. URYNOWICZ, *Assistant Examiner.*